United States Patent
Aizawa et al.

(10) Patent No.: US 9,777,466 B2
(45) Date of Patent: Oct. 3, 2017

(54) MAINTENANCE DEVICE FOR CONSTRUCTION MACHINE

(71) Applicant: Hitachi Construction Machinery Co., Ltd., Tokyo (JP)

(72) Inventors: Taiki Aizawa, Kasumigaura (JP); Yuichiro Morita, Hitachi (JP); Koichi Shibata, Kasumigaura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 112 days.

(21) Appl. No.: 14/770,997

(22) PCT Filed: Jun. 20, 2014

(86) PCT No.: PCT/JP2014/066379
§ 371 (c)(1),
(2) Date: Aug. 27, 2015

(87) PCT Pub. No.: WO2014/203989
PCT Pub. Date: Dec. 24, 2014

(65) Prior Publication Data
US 2016/0002892 A1    Jan. 7, 2016

(30) Foreign Application Priority Data

Jun. 21, 2013 (JP) .................................. 2013-130452

(51) Int. Cl.
| | | |
|---|---|---|
| *E02F 9/26* | (2006.01) | |
| *E02F 9/22* | (2006.01) | |
| *E02F 9/20* | (2006.01) | |
| *G07C 9/00* | (2006.01) | |
| *B60R 16/023* | (2006.01) | |
| *G05B 15/02* | (2006.01) | |
| *G05B 23/02* | (2006.01) | |

(52) U.S. Cl.
CPC ............ *E02F 9/267* (2013.01); *E02F 9/2062* (2013.01); *E02F 9/2066* (2013.01);
(Continued)

(58) Field of Classification Search
CPC ....... E02F 9/267; E02F 9/2066; E02F 9/2062; E02F 9/2292; E02F 9/2296;
(Continued)

(56) References Cited

U.S. PATENT DOCUMENTS

| | | | | |
|---|---|---|---|---|
| 6,349,252 | B1 * | 2/2002 | Imanishi | ................. E02F 9/267 701/32.7 |
| 2004/0186687 | A1 * | 9/2004 | Ogura | .................... E02F 9/205 702/185 |

(Continued)

FOREIGN PATENT DOCUMENTS

| | | |
|---|---|---|
| CN | 102762413 A | 10/2012 |
| JP | 11-284777 A | 10/1999 |

(Continued)

OTHER PUBLICATIONS

International Search Report of PCT/JP2014/066379.
"Volvo Tire Excavator EW145B", 2008, URL: https://www.volvoce.com/SiteCollectionDocuments/VCE/History/06_wheeled%20excavators/04%20Volvo/V%20EW145B/V%20EW145B%2050E1001392_2008-04.pdf.

*Primary Examiner* — Mary Cheung
(74) *Attorney, Agent, or Firm* — Mattingly & Malur, PC

(57) ABSTRACT

A maintenance device for a construction machine includes: an abnormality detection means for detecting abnormality of an apparatus installed on the construction machine; an abnormality information output means for outputting abnormality information about the apparatus detected by the abnormality detection means; and a maintenance mode setting means for setting a maintenance mode for performing a maintenance work of the apparatus, wherein the abnormality information output means for eliminating negation or output of the information, if any abnormality of the apparatus is detected in a state in which the maintenance mode is set by the maintenance mode setting means.

1 Claim, 10 Drawing Sheets

(52) U.S. Cl.
 CPC .......... *E02F 9/2292* (2013.01); *E02F 9/2296* (2013.01); *G07C 9/00007* (2013.01); *B60R 16/0232* (2013.01); *G05B 15/02* (2013.01); *G05B 23/0283* (2013.01)

(58) Field of Classification Search
 CPC ............... G07C 9/00007; G05B 15/02; G05B 23/0283; B60R 16/0232
 See application file for complete search history.

(56) References Cited

U.S. PATENT DOCUMENTS

| | | | |
|---|---|---|---|
| 2007/0213855 A1* | 9/2007 | Furuno | E02F 9/26 700/83 |
| 2010/0070130 A1* | 3/2010 | Suzuki | E02F 9/2054 701/33.4 |
| 2010/0161175 A1* | 6/2010 | Yamada | E02F 9/26 701/33.4 |
| 2011/0010059 A1* | 1/2011 | Suzuki | E02F 9/24 701/50 |
| 2013/0054081 A1 | 2/2013 | Wuerth et al. | |

FOREIGN PATENT DOCUMENTS

| | | |
|---|---|---|
| JP | 2001-295741 A | 10/2001 |
| JP | 2005-041438 A | 2/2005 |
| JP | 2007-018398 A | 1/2007 |
| JP | 2010-282318 A | 12/2010 |
| JP | 2011-005880 A | 1/2011 |
| JP | 2013-520353 A | 6/2013 |

\* cited by examiner

MAINTENANCE DEVICE FOR CONSTRUCTION MACHINE

TECHNICAL FIELD

The present invention relates to a construction machine such as a hydraulic excavator, in particular to a maintenance device for a construction machine that disables output of abnormality information during maintenance work.

BACKGROUND ART

Commonly, a construction machine such as a hydraulic excavator has a controller (information processing device) installed on it that electronically controls the operation of various in-vehicle devices and apparatuses. The controller has a failure determination function to determine whether the various in-vehicle devices and apparatuses operate normally inside the construction machine. A result of the failure determination by the failure determination function is temporarily stored at the controller and then periodically transmitted to an information center or the like via a wireless communication terminal for a subsequent use, for instance, for the analysis of the cause of failure of the vehicle body.

The failure determination function of the controller is always working. This may cause the controller to determine that a failure has occurred in the absence of abnormalities (or malfunctions) in the in-vehicle device or apparatus as in the case of maintenance work of the vehicle body, such as exchange of parts, and to transmit abnormality information. However, the information center that received this abnormality information is unable to accurately determine whether the abnormality information is correct, i.e., whether it is caused by a failure or by a maintenance work, which makes it difficult to obtain correct data.

To avoid this, for instance, PTL 1 indicated below proposes a technology that eliminates transmission and reception of abnormality information generated upon exchange of parts by preliminarily setting, for instance, position information about a service shop where a maintenance work is performed or its periphery and road information. PTL 2 indicated below proposes a technology that eliminates transmission of abnormality information when an abnormality diagnosis apparatus that is able to collect abnormality information is connected to the vehicle body, for instance, at a service shop.

CITATION LIST

Patent Literature

PTL1: JP 2011-5880 A
PTL2: JP 2005-41438 A

SUMMARY OF INVENTION

Technical Problem

However, the above-mentioned technologies require that position information about the service shop where maintenance work is performed or its periphery and road information is set in advance and in addition, abnormality information about maintenance work performed at a place other than the service shop such as a customer site is difficult to be accurately determined whether it is correct. In case that failure diagnosis equipment is used, the equipment must be connected to the vehicle body all the time during the maintenance operation.

The present invention is to solve these problems and has for its main object to provide a novel maintenance device for a construction machine that is able to eliminate output of erroneous abnormality information that is generated upon a maintenance work.

Solution to Problem

In order to solve the problem, a maintenance device for a construction machine according to the 1st invention comprises: an abnormality detection means for detecting abnormality of an apparatus installed on the construction machine; an abnormality information output means for outputting abnormality information about the apparatus detected by the abnormality detection means; and a maintenance mode setting means for setting a maintenance mode for performing a maintenance work of the apparatus, wherein the abnormality information output means for eliminating negation or output of the information, if any abnormality of the apparatus is detected in a state in which the maintenance mode is set by the maintenance mode setting means.

This arrangement reliably avoids output erroneous abnormality information that is generated upon maintenance work by switching over the mode of the construction machine to a maintenance mode prior to upon maintenance work. This eliminates reception of erroneous abnormality information and in addition contributes to a reduction in communication load. The term "maintenance mode" as used herein refers to a state or condition in which although various devices and apparatuses installed on the construction machine as exemplified later are in an activated state or condition by being supplied energy, for instance, from batteries through keying on of the engine switch in order to maintain them, but in principle the engine is stopped.

According to the 2nd invention, in the maintenance device for a construction machine according to the 1st invention, the maintenance mode setting means, upon receipt of a request for setting a maintenance mode, requests inputting a password for authentication and allows the maintenance mode to be set if the password is identical with a preset password. This arrangement allows only regular personnel who participate in the maintenance work who know the relevant password to set the construction machine in a maintenance mode and thus enables output and notice of abnormality information if exchange or modification of the apparatus by a person other than the regular personnel who participate in the maintenance work occurs.

According to the 3rd invention, the maintenance device for a construction machine according to the 1st and the 2nd inventions further comprises: an engine start up lock means for locking start up of an engine in a state in which the maintenance mode is set, wherein the engine start up lock means, if a request for engine start up is made in a state in which the maintenance mode is set, requests inputting a password for authentication and if the input password is identical with a preset password, unlocks the engine start up.

This arrangement enables the engine to be directly started up in the maintenance mode. Consequently, upon maintenance work with starting up the engine, such as test drive, if any abnormality is detected in various in-vehicle devices and apparatuses, a state in which negating or outputting such information is eliminated can be maintained.

According to the 4th invention, the maintenance device for a construction machine according to any one of the 1st through the 3rd invention further comprises: a maintenance mode notice means for indicating that the construction machine is in a maintenance mode. This arrangement enables the operator to recognize without fail that the maintenance mode is set via display on the monitor screen or sound.

According to the 5th invention, in the maintenance device for a construction machine according to any one of the 1st through the 4th invention, the maintenance mode setting means, the engine start up lock means, and the maintenance mode notice means constitute a monitor device that includes an input means having a maintenance mode switch and a display means. This arrangement enables the operator to use a single monitor device to perform, for instance, on/off of the maintenance mode switch and input of the password as well as display of the abnormality information.

Advantageous Effects of Invention

According to the present invention, the construction machine is provided with a maintenance mode setting means that upon a maintenance work causes the construction machine to be switched to a maintenance mode prior to the maintenance work. This prevents the abnormality detection means from outputting erroneous abnormality information that is generated upon maintenance work. This eliminates transmission and reception of erroneous abnormality information, so that communication data amount can be decreased, which contributes to a decrease in communication load.

DESCRIPTION OF EMBODIMENTS

Figure 1:
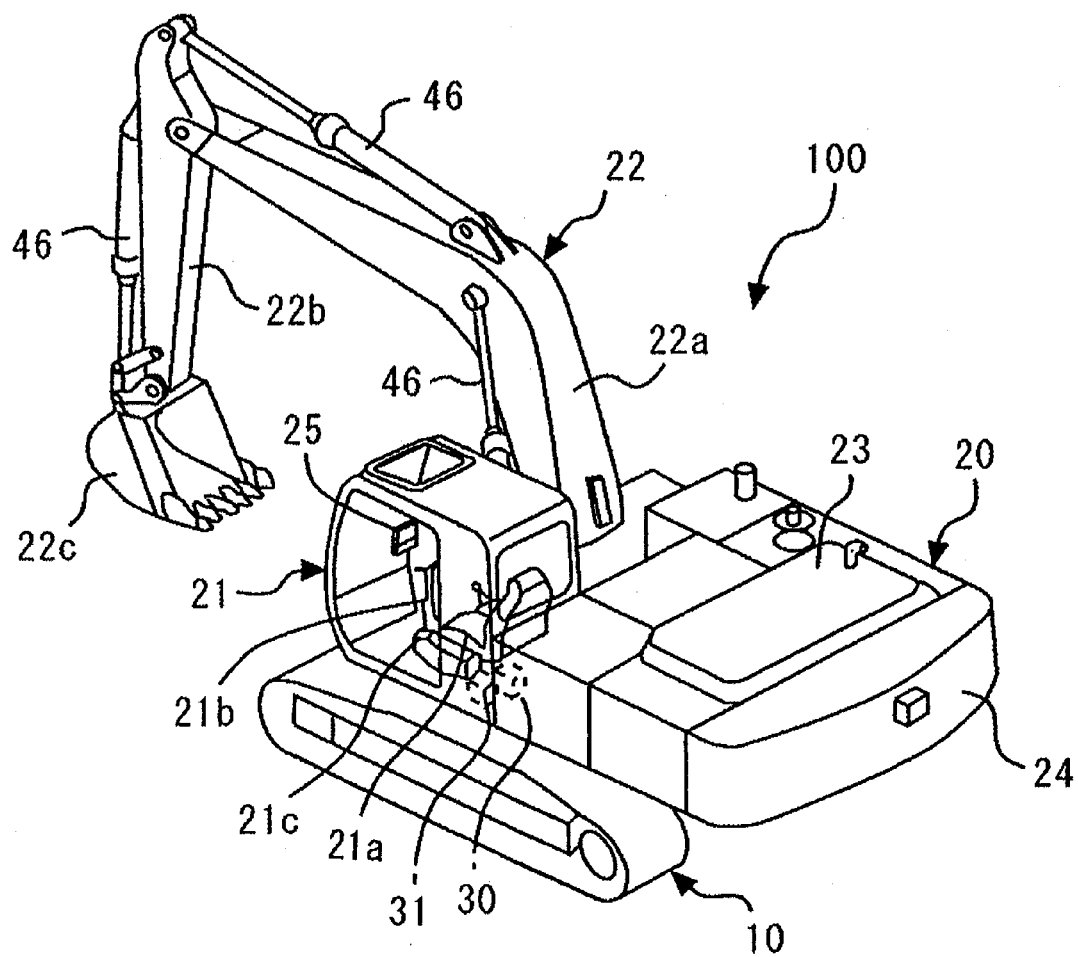
FIG. 1 is a perspective view showing an embodiment of a hydraulic excavator 100, one of the construction machines according to the present invention.

Now, an embodiment of the present invention is explained with reference to the attached drawings. FIG. 1 shows an embodiment of a hydraulic excavator 100, which is one of the construction machines according to the present invention. As shown in FIG. 1, the hydraulic excavator 100 includes as main components an undercarriage 10 that travels with a crawler and an upperstructure 20 provided swingably on the undercarriage 10. The upperstructure 20 includes a cab 21 having a driver seat 21a and a front operation machine 22 on the front side of an upperstructure frame (not shown) and on the back side an engine room 23 accommodating an engine, a heat exchanger (not shown) and so on and on the further back side of these a weight 24, etc.

The front operation machine 22 includes a boom 22a, an arm 22b, bucket 22c and hydraulic cylinders 46, 46 . . . and so on. These parts are operated by operating operation levers 21b provided on both sides of the driver seat 21a in the cab 21 to slide the respective hydraulic cylinders 46, 46, . . . . In the configuration shown in FIG. 1, the bucket 22c is attached to a leading end of the arm 22b. However, instead of the bucket 22c, various attachments such as a grabbler may be attached. The movement mechanism of the undercarriage 10 may use tires instead of the crawler.

In front of the driver seat 21a is provided a monitor device 25 provided with a liquid crystal display unit, which is able to display various types of information described later. Near the operation lever 21b on the left side of the driver seat 21a is provided a gate lock lever (GL) 21c. When the gate lock lever 21c is held up, a locked state is set. In this state, if the operation lever 21b is tilted while the engine is being started up, the vehicle body will not move and tilting down of the gate lock lever 21c allows the vehicle body to move.

Figure 2:
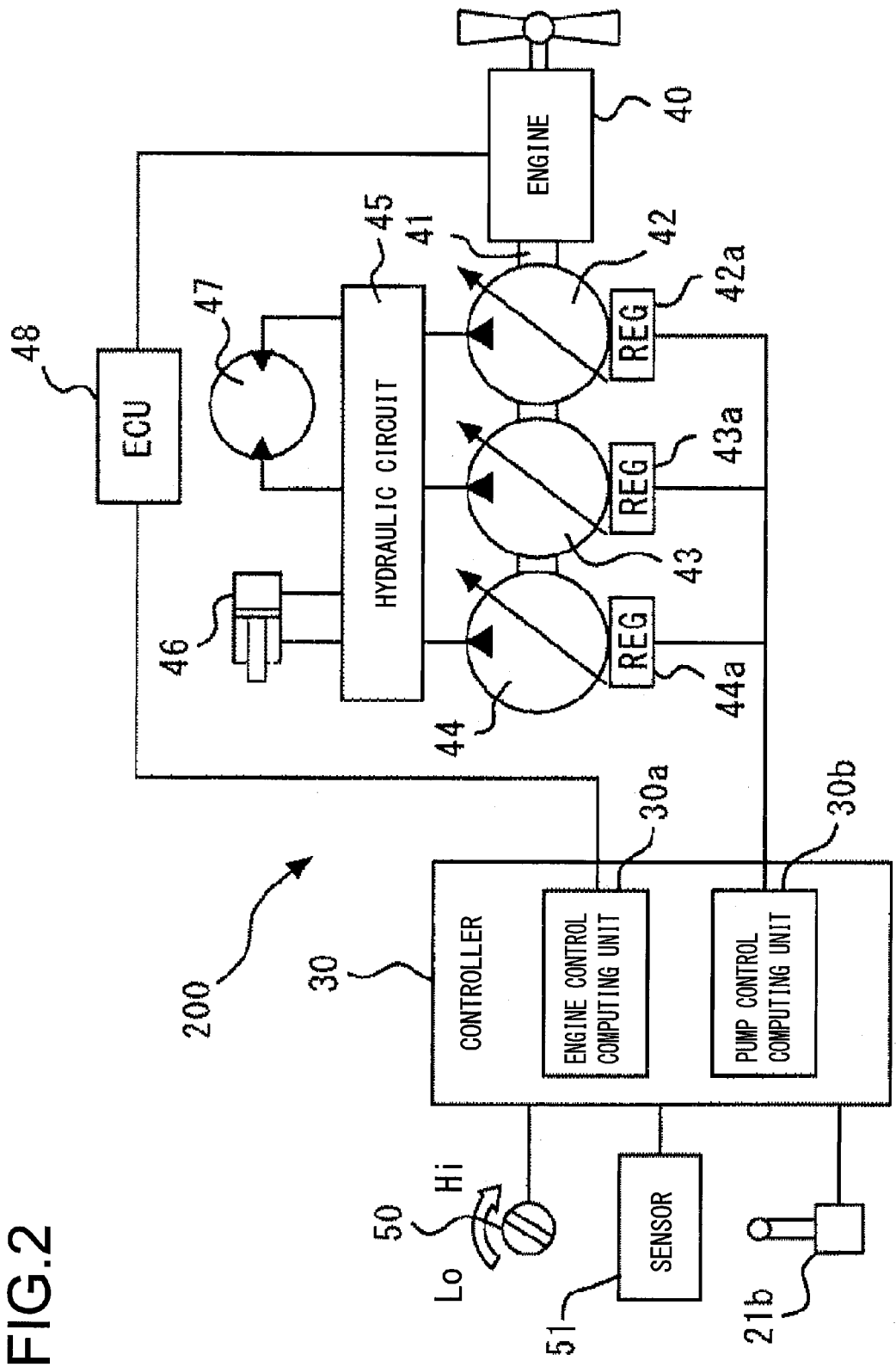
FIG. 2 is an overall view showing a hydraulic system 200 controlled by a controller 30.

At the back of the driver seat 21a, for instance, a controller 30 and a wireless communication terminal 31 are accommodated. The controller 30 controls overall the hydraulic system 200 as shown in FIG. 2. In FIG. 2, reference numeral 40 denotes an engine having an output axle 41, to which are connected a first hydraulic pump 42, a second hydraulic pump 43, and a third hydraulic pump 44, which are variable displacement pumps. Pressure oil delivered from each of the hydraulic pumps 42, 43, 44 is sent to a hydraulic circuit 45 that includes a control valve and is controlled for its quantity and flow direction and supplied to, for instance, a hydraulic cylinder 46 and a hydraulic motor 47.

The controller 30 receives signals that are input from an engine control dial 50, various types of sensors 51, and the operation lever 21b and so on and integrally controls an engine control computing unit 30a and a pump control computing unit 30b based on the input signals.

That is, the engine control dial 50 is able to adjust a command value of rotation speed. The command rotation speed adjusted by the engine control dial 50 is input to the engine control computing unit 30a. The engine control computing unit 30a calculates a target engine rotation speed based on the value input to it and sends the calculated target engine rotation speed to an engine control unit (ECU) 48. The ECU 48 controls the rotation speed of the engine based on the target engine rotation speed.

On the other hand, a signal from the sensor 51 that detects pump pressure, etc. and an operation signal from the operation lever 21b are input into the engine control computing unit 30a and the pump control computing unit 30b. The pump control computing unit 30b calculates command values based on the input values and controls the hydraulic pumps 42, 43, 44 to be driven based on the calculated command values. Specifically, the pump control computing unit 30b is configured to send pump torque pressure necessary for pump regulators 42a, 43a, 44a that regulate pump deliveries so that pumping rates in correspondence to the operation amount of the operation lever 21b can be obtained.

Figure 3:
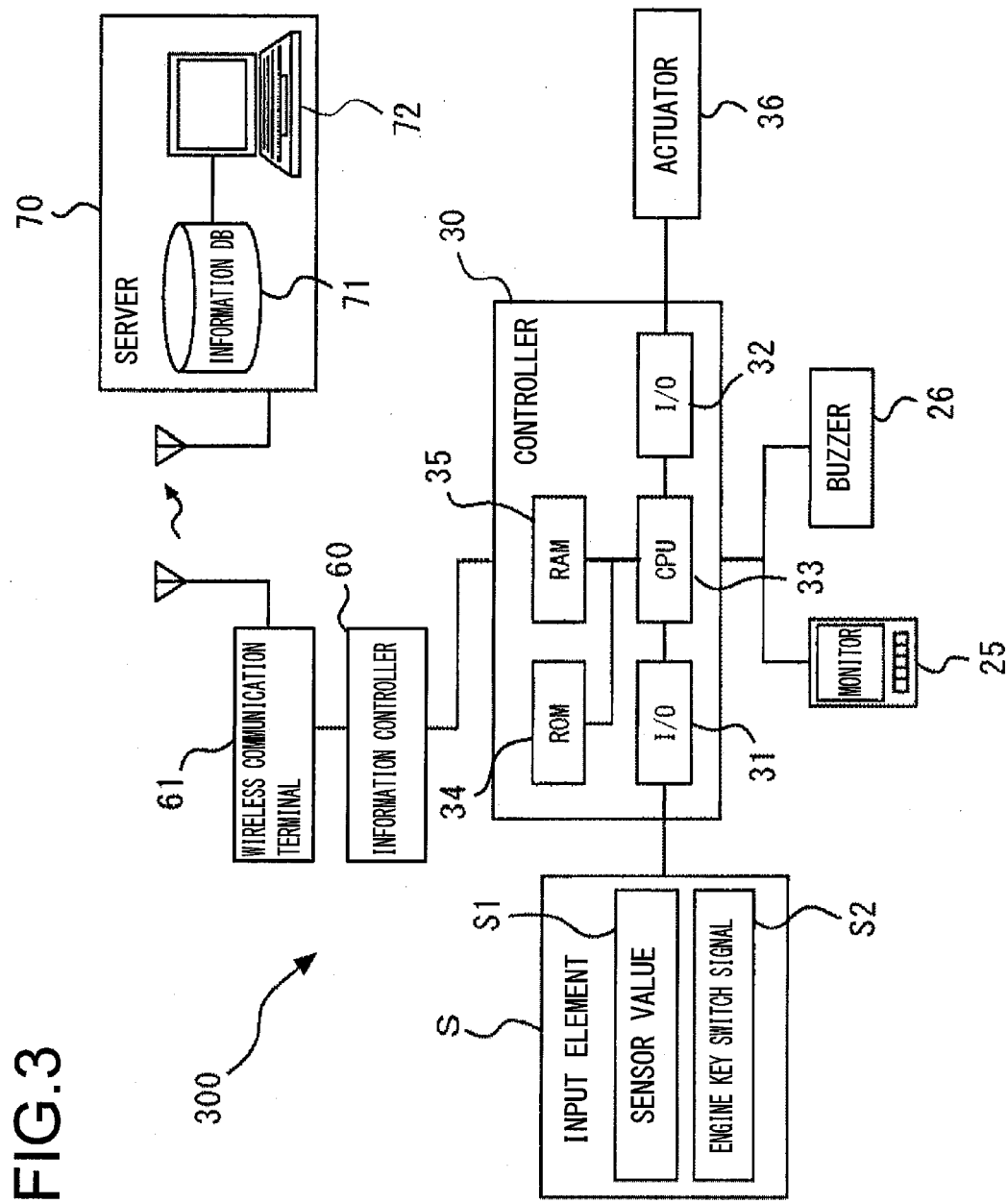
FIG. 3 is a block diagram showing the arrangement of a maintenance device 300 of the present invention.

FIG. 3 is a block diagram showing the arrangement of a maintenance device 300 according to the present invention, focusing on the controller 30. As shown in FIG. 3, the maintenance device 300 includes the controller 30, an information controller 60, and a wireless communication terminal 61 and so on. The controller 30 is constituted by an information processing device including hardware such as input/output interfaces 31, 32, a CPU 33, a ROM 34, and a RAM 35.

To the input/output interface 31 of the controller 30 are input elements S such as a sensor signal S1 and an engine key switch signal S2 and predetermined computing processing is performed at the CPU 33 based on the input elements S. The calculated output signal as command signals are output from the input/output interface 32 to hydraulic pumps 42 to 44 and actuator 36 such as a hydraulic cylinder 46. A control program used to cause predetermined computing processing to be executed at the CPU 33 is stored at the ROM 34. It is loaded at the RAM 35 when the engine key switch signal S2 is input and sequentially executes various controls described later.

Figure 4:
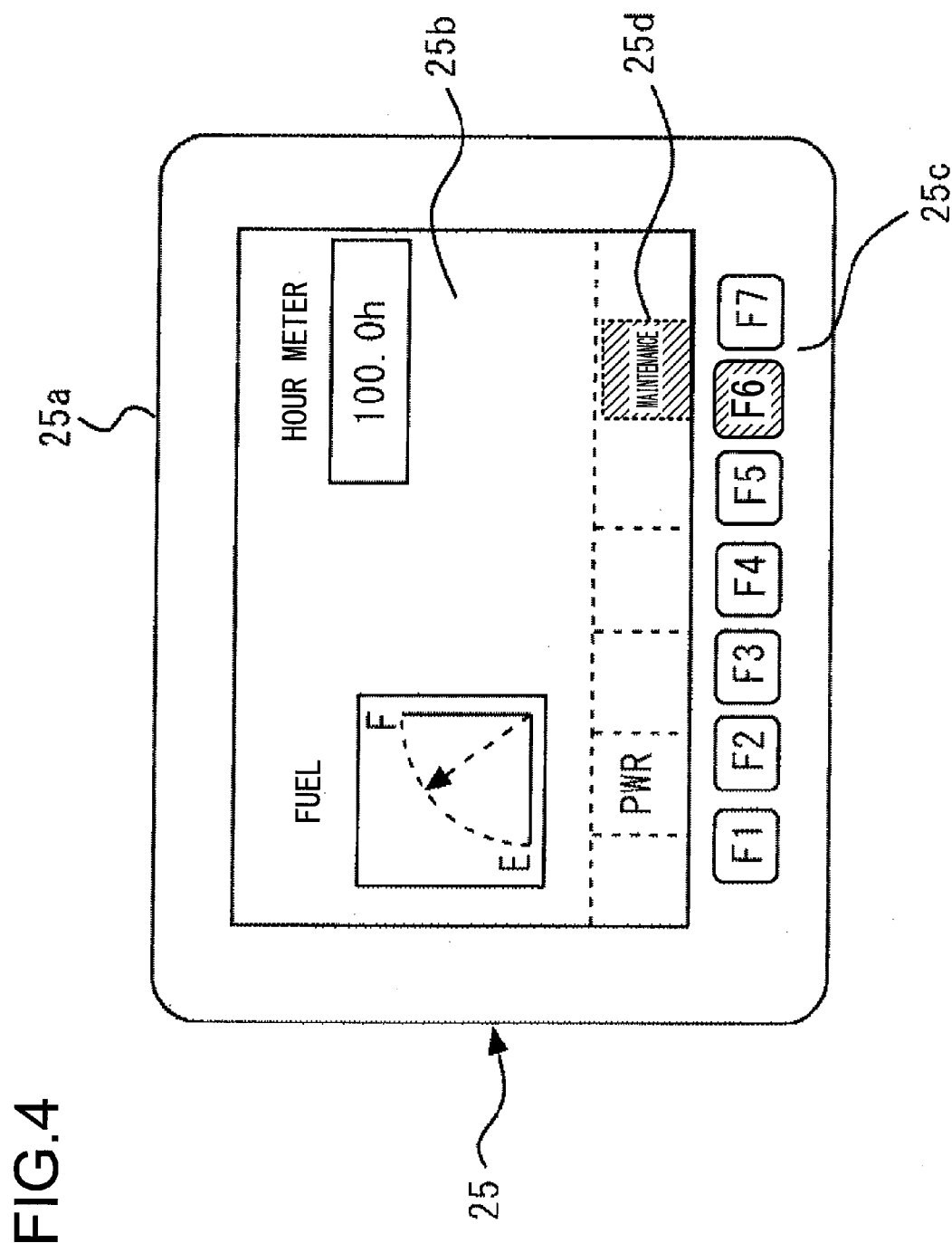
FIG. 4 is a front view showing an example of a monitor device 25.

The controller 30 has an abnormality detection function (abnormality detection program) that detects abnormality of various devices and apparatuses installed on the vehicle based on signals input from them. If the controller 30 determines that abnormality is detected, it causes it to be brought on display on the monitor device 25 in front of the driver seat 21a. FIG. 4 shows an example of the monitor device 25. The monitor 25 has a monitor body 25a in a rectangular shape and a liquid crystal display unit 25b on the front surface of the monitor body 25a and an input unit 25c constituted by a plurality of input switches on the lower part of the monitor body 25.

Among the plurality of input switches F1 to F7 that constitute the input unit 25c is provided a maintenance mode switch F6 for switching the mode of the vehicle body to a maintenance mode. When, for instance, a maintenance person presses the maintenance mode switch F6 (switches on) after turning the engine key switch on, the vehicle body is switched over to a maintenance mode as described later, and the switch over of the vehicle body to a maintenance mode is brought up on display, for instance by lighting up an icon 25d at the liquid crystal display unit 25b. The switch over signal to switch to the maintenance mode is input into the controller 30 and the controller 30 switches over the mode of the vehicle body to a maintenance mode.

The operator can visually grasp what abnormality occurs to the vehicle body on the driver seat 21a by acknowledging the abnormality information that is brought up on display at the monitor device 25. The controller 30 is configured to perform not only processing for bringing up an alarm on display at the monitor device 25 but also processing for issuing audible alarm if the abnormality is serious, for instance, by activating a buzzer device 26 to issue a warning buzzer sound to notify the operator and the like of occurrence of an emergency without fail.

This abnormality information is simultaneously stored at the information controller 60, which transmits the stored abnormality information as needed or periodically to a server 70 via the wireless communication device 61. The server 70 in receipt of this signal stores the received abnormality information at an abnormality information database 71. This allows a terminal 72 at each business site or factory to confirm the abnormality information by accessing to the server 70.

Figure 5:
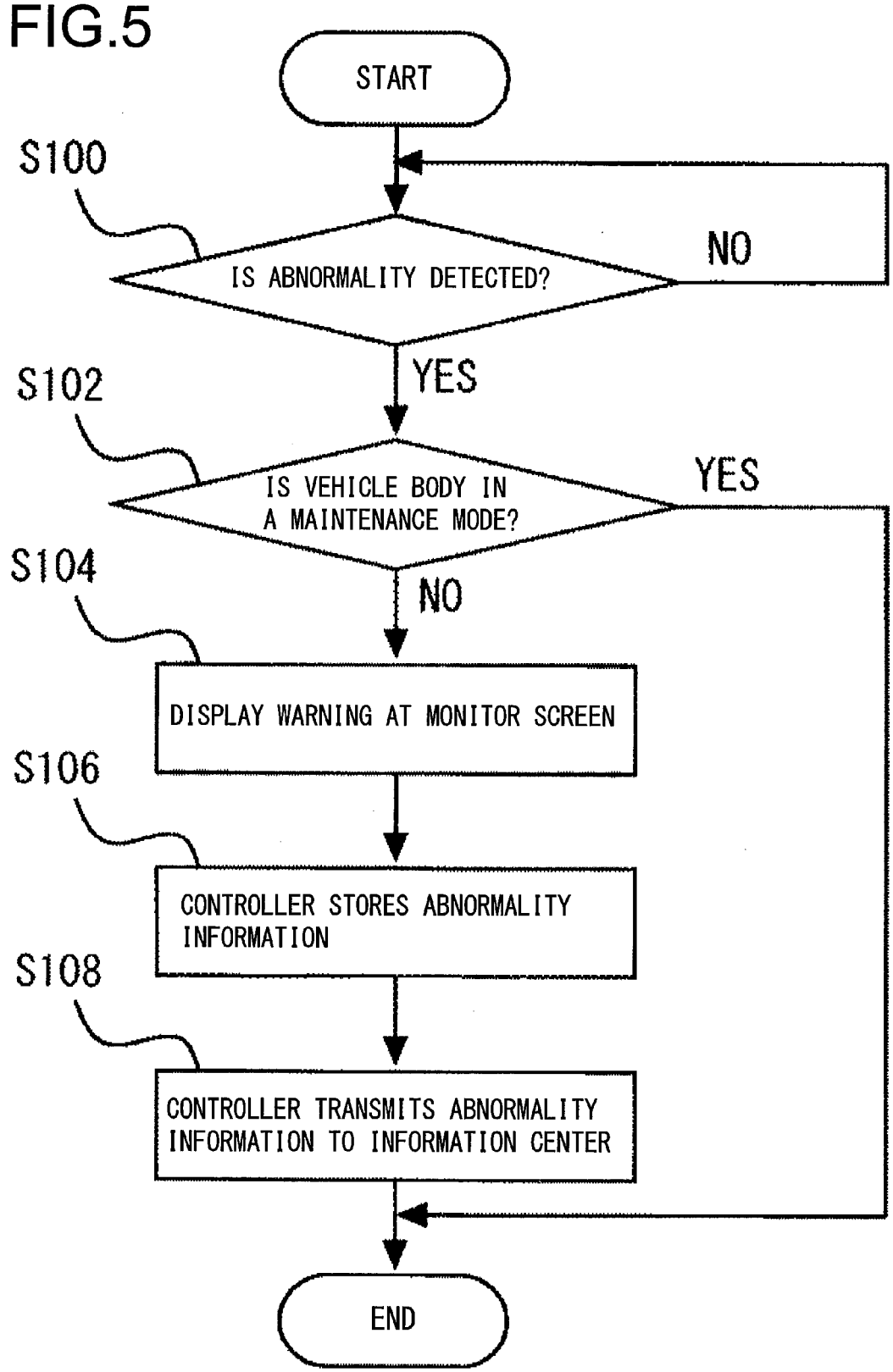
FIG. 5 is a flowchart illustrating the flow of processing of abnormality information by the maintenance device 300 of the present invention.

FIG. 5 is a flowchart illustrating the flow of processing of abnormality information by the maintenance device 300 according to the present invention having the configuration as described above. As shown in FIG. 5, the maintenance device 300 determines in a first step S100 whether abnormality is detected based on input signals from input elements S such as various sensors. If it determines that abnormality is detected (YES), the operation proceeds to a next step S102. Detection of the abnormality is achieved as follows. If, for instance, disconnection or short occurs between sensor signals, then the voltage value of a sensor signal that is input into the controller 30 exceeds a certain threshold value. Consequently, the controller 30 detects sensor high voltage abnormality if the voltage value of the sensor signal exceeds the upper threshold value. On the contrary, if the voltage value of the sensor signal is below the lower threshold value, the controller 30 detects sensor low voltage abnormality.

In step S102 the controller 30 determines whether the vehicle body is in a maintenance mode upon detection of the abnormality. If it determines that the vehicle body is in a maintenance mode (YES), the information controller 60 negates the abnormality information without storing it and terminates the processing. On the other hand, if the controller 30 determines that the vehicle body is not in a maintenance mode (NO), that is, the vehicle body is in a normal work state, the operation proceeds to a next step S104. In step S104, the controller 30 causes an alarm for the abnormality to be brought up on display on the liquid crystal display unit 25b of the monitor device 25 and simultaneously, in step S106, the information controller 60 stores the abnormality information and the operation proceeds to a next step S108. In step S108, processing to transmit the stored abnormality information from the wireless communication device 61 to the server 70 is executed after a predetermined time elapsed.

As described above, the maintenance device according to the present invention, which includes the maintenance mode switch 25c that switches over the vehicle body to a maintenance mode, for instance, at the monitor device 25, is able to reliably avoid outputting erroneous abnormality information that would arise with the maintenance work by switching the vehicle body to a maintenance mode with the switch 25c before a maintenance work, such as exchange of a part or parts, is started. This eliminates transmission and reception of erroneous abnormality information so that the amount of communication data can be reduced, which contributes to a reduction in communication load. The switching operation may be achieved by using a touch panel or dial operation instead of the maintenance mode switch 25c.

Figure 6:
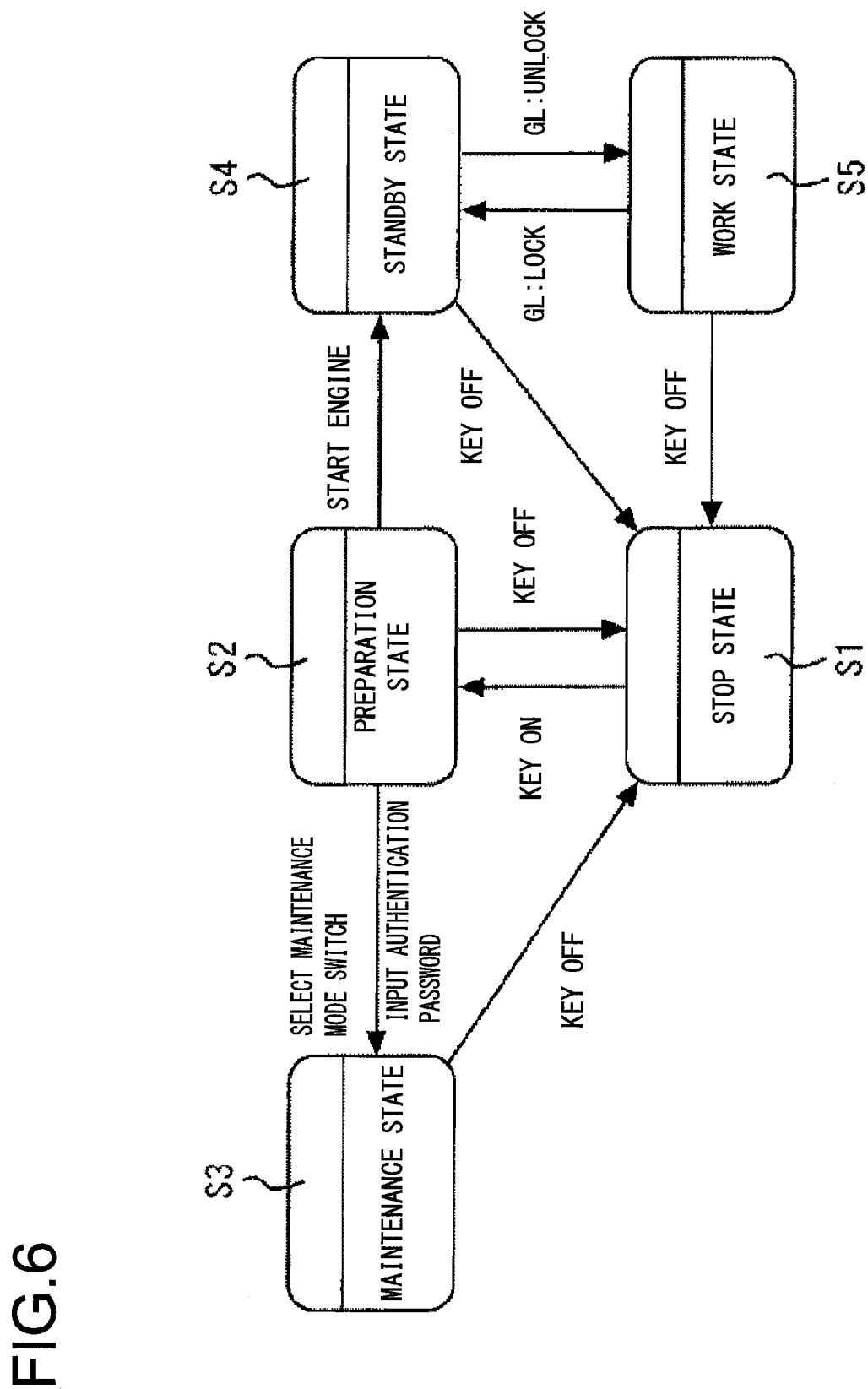
FIG. 6 is a state transition diagram of the vehicle body in case a maintenance mode is set.
Figure 7:
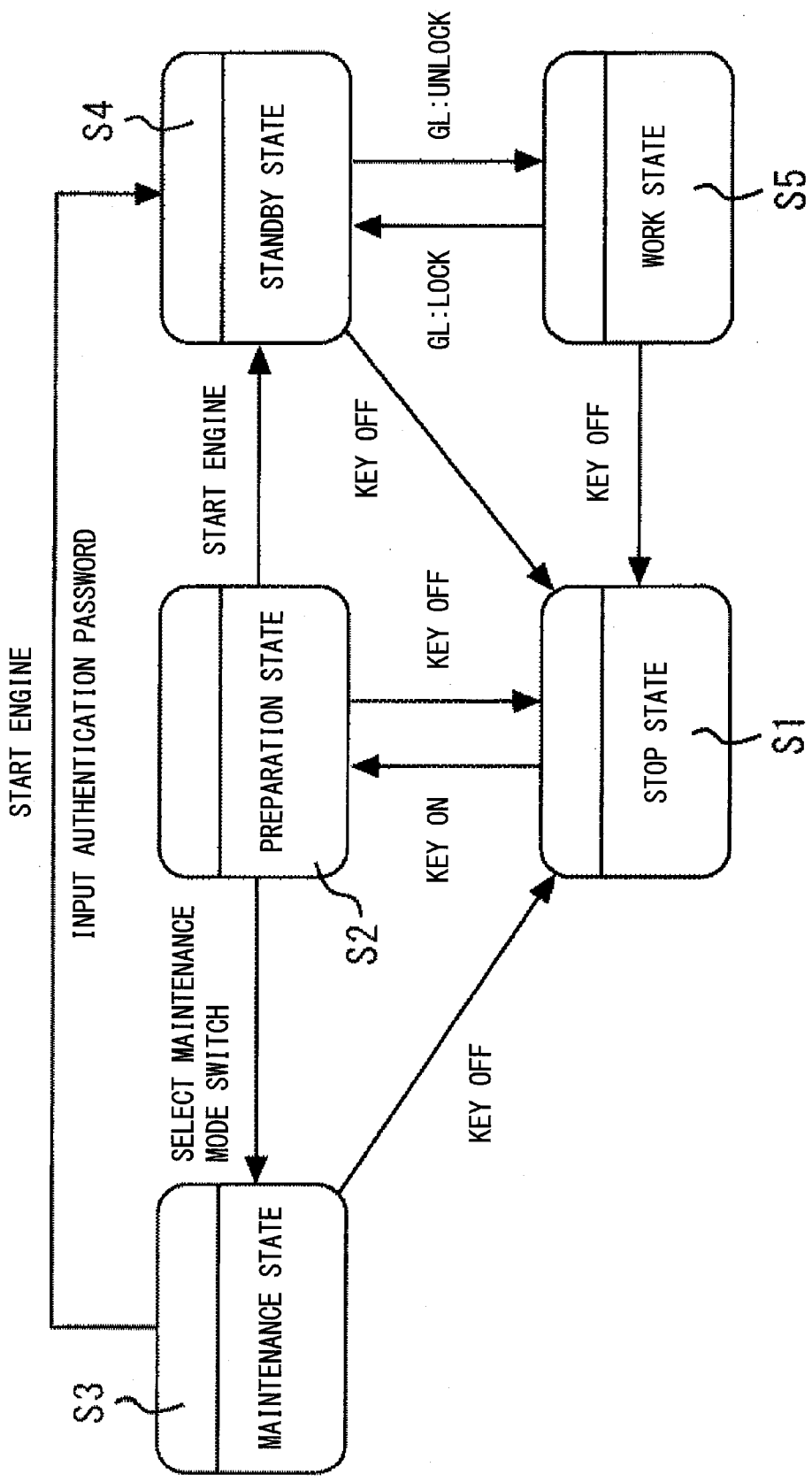
FIG. 7 is a state transition diagram of the vehicle body in case a maintenance mode is set.

FIGS. 6 and 7 show each the transition state of the vehicle body when the maintenance mode as described above is set. First, when the vehicle body is in a stop state S1, the engine key switch is off and the engine is in a stop state as shown in FIG. 6. If the engine key switch is turned to key on in this state, the power-supply line from the batteries is connected to the controller 30 and other parts to activate the controller 30 to transition to a preparation state S2 for awaiting the start up of the engine.

If, in this preparation state, the engine key switch is further turned to a start position, the engine starts up and the vehicle body transitions to a standby state S4. In this state, the gate lock lever 21b is in a locked state. When the gate lock lever 21b is unlocked, the vehicle body transitions to a work state S5 to be ready for the operation of the front work machine 22 or travel operation of the undercarriage 10. If, in the work state S5, the engine key switch is returned to the original position to key off, the engine is stopped to bring the vehicle body to a stop state.

Figure 8:
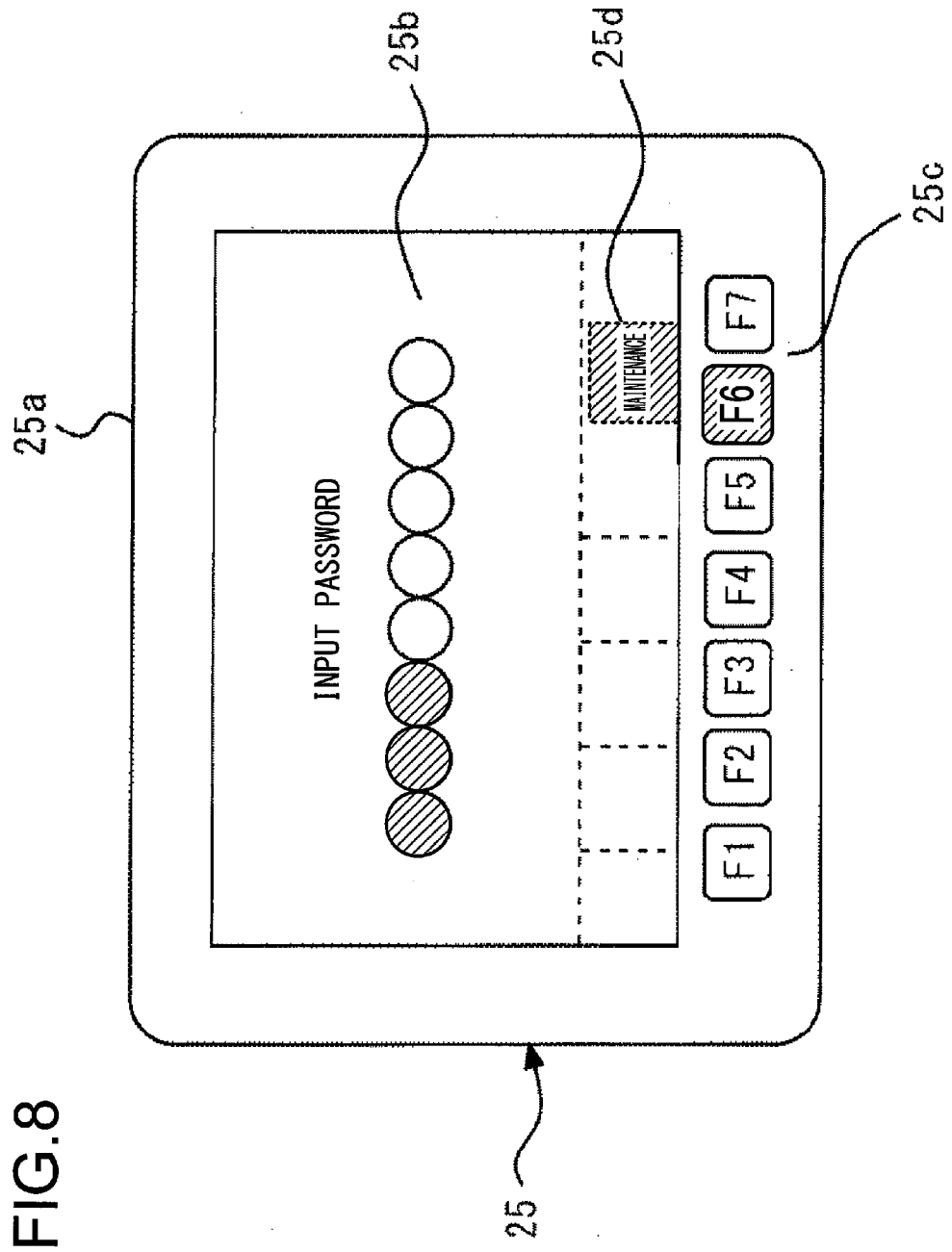
FIG. 8 is a front view of a display example of a monitor device 25 in case input of a password is requested.

On the other hand, if the maintenance mode switch F6 of the monitor device 25 is pressed in the preparation state S2, the vehicle body transitions to a maintenance state (maintenance mode) S3. In this case, the controller 30 may be configured to request inputting an authentication password and allow the vehicle body to transition to the maintenance state S3 only if the authentication password is identical to a preset one. FIG. 8 shows an example of display at the monitor device 25 when the inputting a password is requested. In case the password for authentication is requested, it should be of, for instance, 8 digits and a message such as "INPUT A PASSWORD" is brought up on display at the display unit 25a as shown in FIG. 8.

By requesting an authentication password upon transition to a maintenance mode and allowing transition to a maintenance state (maintenance mode) S3 only when the authentication password is identical to the preset one as described, it is possible to allow the maintenance work to be dealt with only by a qualified person or persons. To start up the engine in the maintenance state S3, the engine key switch is once turned off to return to the stop state S1 and then turned to the preparation state S2. Thereafter, the engine key switch is further turned to start up the engine. Thus, the vehicle body transitions to the standby state S4.

Figure 9:
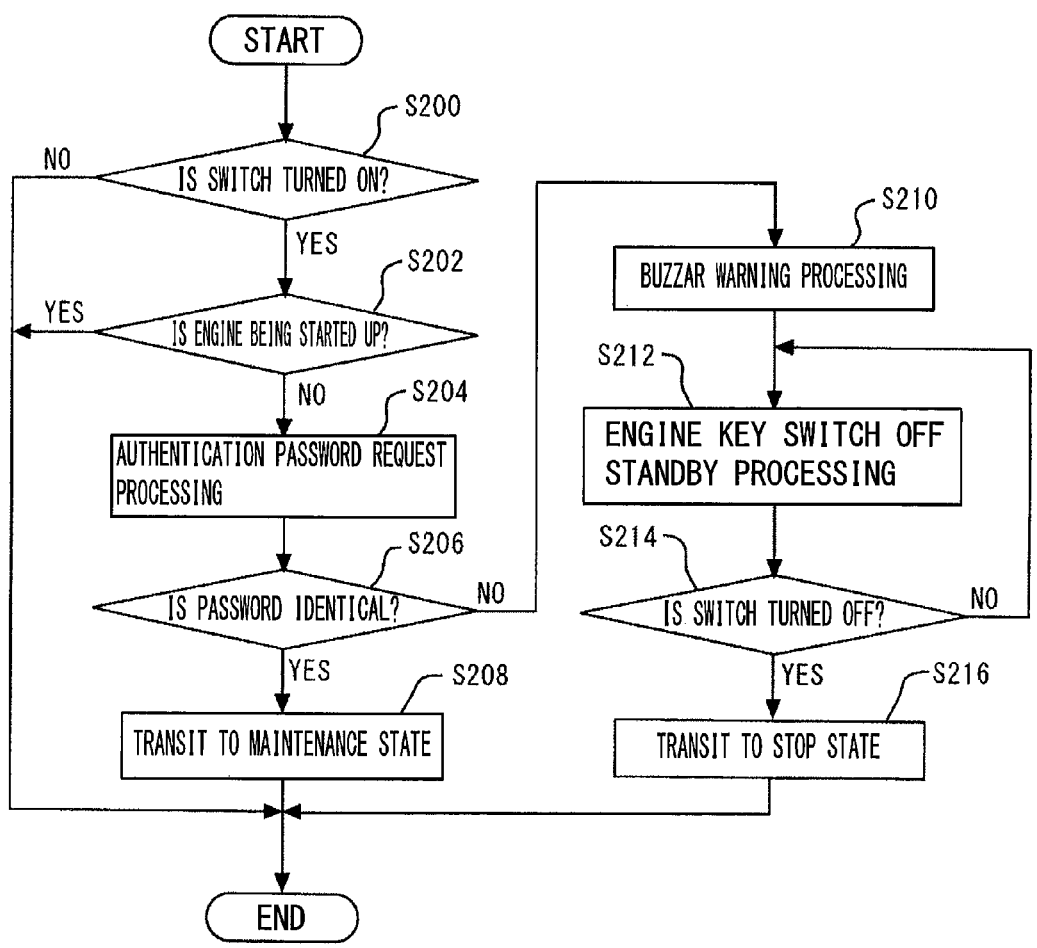
FIG. 9 is flowchart illustrating the flow of processing in case input of an authentication password is requested upon transition to a maintenance mode.

FIG. 9 is a flowchart illustrating the flow of processing in case input of an authentication password is requested upon transition to the maintenance mode. First, the controller 30 determines whether the maintenance mode switch F6 is pressed in the first step S200. If it determines that the maintenance mode switch F6 is not pressed (NO), it causes the processing to end immediately, whereas if it determines that the maintenance mode switch F6 is pressed (YES), it causes the operation to proceed to the next step S202. In step S202, the controller determines whether the engine is started up. If it determines that the engine is started up (YES), it causes the processing to end immediately, whereas if it determines that the engine is not started up, that is, the engine is at a stop (NO), it causes the operation to proceed to the next step S204 to execute the processing for requesting inputting an authentication password and then to the next step S206.

In step S206, the controller 30 makes a decision on the input password. If it decides that the password is identical (YES), it causes the operation to proceed to the next step S208 to allow the vehicle body to transition to the maintenance state, whereas if it decides that the input password is not identical (NO), it causes the operation to proceed to step S210 to buzz an alarm to perform processing for notifying the occurrence of an input mistake. Then it causes the operation to proceed to the next step S212. The controller 30 may be configured to cause the monitor device 25 to bring up on display a predetermined warning instead of or in addition to the buzzer warning. The controller 30 may be configured to set a limit to the number of times of inputting any password to allow reentering any password until the set number of times of inputting is reached and disallow further reentering any password once the number of times of inputting of passwords exceeds the set number of times.

In step S212, the controller 30 executes the processing to bring the vehicle body to an engine key switch off waiting state and then causes the operation to proceed to the next step S214 to determine whether the engine key switch is turned off. If it determines that the engine key switch is not turned off (NO), it causes the operation to return to step S212, whereas if it determines that the engine key switch is turned on (YES), it causes the operation to proceed to the next step S216 to cause the vehicle body to transition to the stop state and causes the processing to end.

Here, as shown in FIG. 7, the controller 30 may be configured to request inputting an authentication password in case the engine is started up in the maintenance state S3 to allow the vehicle body to transition to the standby state S4. In other words, if a person other than the authorized people who participate in the maintenance work accidentally starts up the engine in the maintenance state S3, unforeseen circumstances may arise. Accordingly, the controller 30 is configured to request inputting an authentication password in case the engine is to be started up directly in the maintenance state S3 and allow the engine to be started up only if the input password is identical with the preset one. This enables unforeseen circumstances such as start up of the engine during maintenance work to be avoided.

If it is necessary to perform this maintenance work in a state in which the engine is started up, the controller 30 may be configured to enable transition from the maintenance state S3 to the standby state S4 directly to allow the maintenance mode to continue. This avoids inconveniences such as storage and transmission of abnormality information associated with the maintenance work at the time when the engine is started up. In this case, the controller 30 is configured to cause the maintenance state 33 to be reset when the engine key switch is turned off (or the engine is in a stop state).

Figure 10:
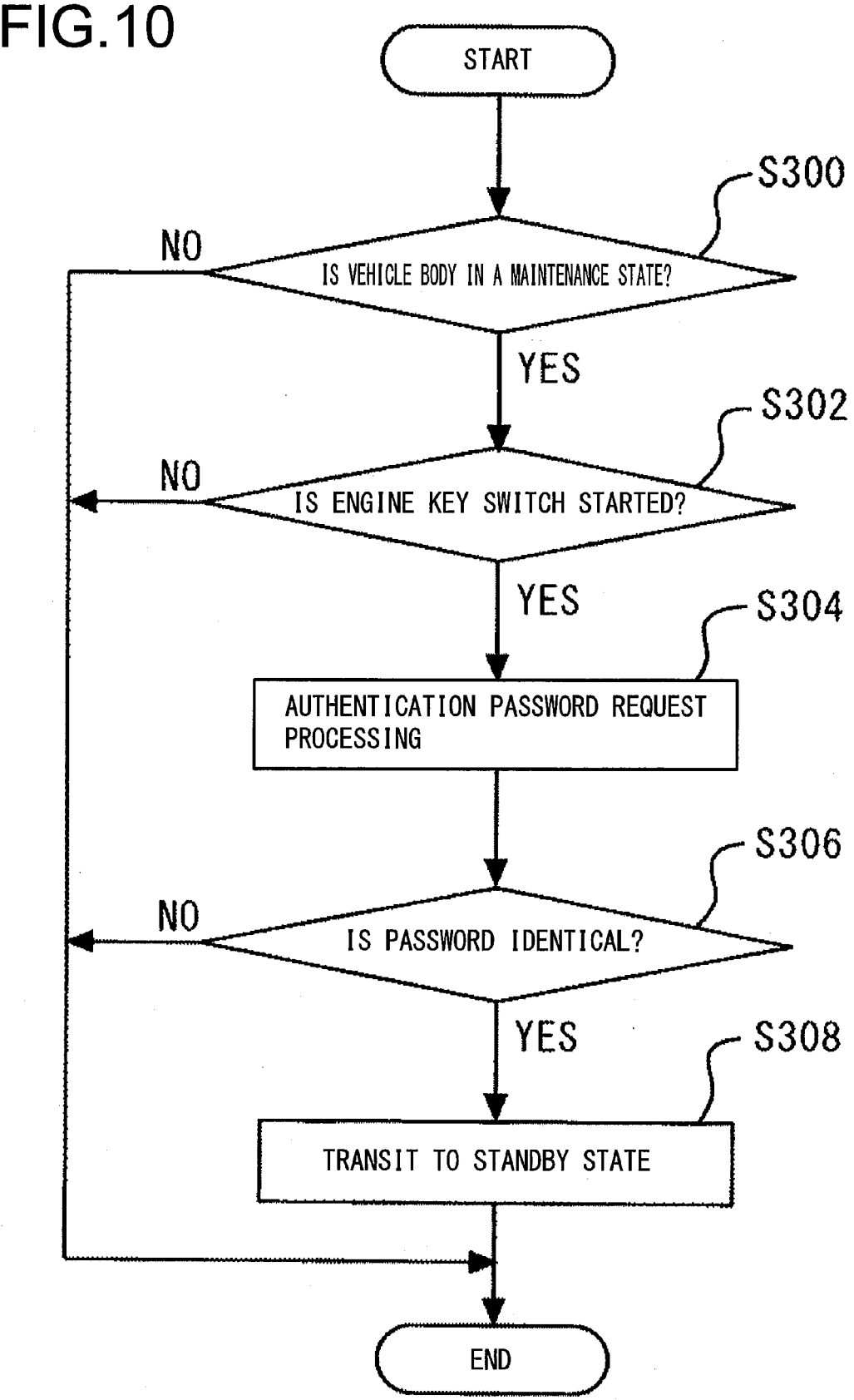
FIG. 10 is a flowchart illustrating the flow of processing in case the engine is directly started up.

FIG. 10 is a flowchart illustrating the flow of processing when the engine is directly started up in the maintenance state S3 as described above. First, the controller 30 determines in a first step S300 whether the vehicle body is at present in the maintenance state S3. If it determines that the vehicle body is not in the maintenance state S3 (NO), it causes the processing to end, whereas if it determines that the vehicle body is in the maintenance state S3 (YES), it causes the operation to proceed to the next step S302. In step S302, the controller 30 determines whether the engine key switch is turned to the engine start up position. If it determines that the engine key switch is not turned to that position (NO), it causes the processing to end directly, whereas if it determines that the engine key switch is turned to that position (YES), it causes the operation to proceed to the next step S304 to request an authentication password and then to the next step S306.

In step S306, the controller 30 makes a decision as to whether the input password is identical with the preset one. If it decides that the input password is not identical with the preset one, it causes the processing to end directly, whereas if it decides that the input password is identical with the preset one (YES), it causes the operation to proceed to the next step S308 to transition to the standby state S4 and causes the processing to end.

It often happens that during maintenance work, another worker who is unaware that the vehicle body is being maintained tries to drive it. To avoid this, when the engine is to be started up, a warning signal for driving the vehicle body, such as a horn sound, is given according to a standard operating procedure. However, some operators may disregard or forget such a standard operating procedure. Accordingly, the configuration to request an authentication password upon starting up the engine during the maintenance work as described above eliminates a risk that the vehicle body is operated by a person other than the person who participates in the maintenance work and secures safety upon the maintenance work. In this embodiment, explanation is made on the example in which a hydraulic excavator is used as the construction machine. However, the same is equally true of wheel loaders, dump trucks, and bulldozers and so on.

REFERENCE SIGNS LIST

100 . . . hydraulic excavator (construction machine)
200 . . . hydraulic system
300 . . . maintenance device
10 . . . undercarriage
20 . . . upperstructure
25 . . . monitor device (maintenance mode setting means, engine start lock means, maintenance mode notice means)
25b . . . display unit
25c . . . input unit
26 . . . buzzer device (maintenance mode notice means)
30 . . . controller (abnormality detection means, maintenance mode setting means, engine start up lock means)
60 . . . information controller (abnormality information output means)
61 . . . wireless communication terminal (abnormality information output means)
F6 . . . maintenance mode switch

The invention claimed is:

1. A maintenance device for a construction machine, comprising:

an abnormality detection unit that detects abnormality information of an apparatus installed on the construction machine;

an abnormality information output unit that outputs the abnormality information about the apparatus detected by the abnormality detection unit;

a storage unit that stores the abnormality information about the apparatus outputted by the abnormality information output unit;

a controller that controls output processing of the abnormality information output unit and storing processing of the storage unit;

a maintenance mode setting unit that sets a maintenance mode for performing a maintenance work of the apparatus;

an engine start up lock unit that locks start up of an engine in a state in which the maintenance mode is set; and an unlock unit that unlocks the start up of the engine, wherein, when the maintenance mode is not set, the controller executes the output processing and the storing processing of the abnormality information about the apparatus detected by the abnormality detection unit, and when the state in which the maintenance mode is set is continued and the start up of the engine is unlocked by the unlocked unit, the controller does not execute the output processing and the storing processing of the abnormality information about the apparatus detected by the abnormality detection unit.

* * * * *